United States Patent
Wharton

(10) Patent No.: US 9,477,141 B2
(45) Date of Patent: Oct. 25, 2016

(54) AERIAL MOVEMENT SYSTEM HAVING MULTIPLE PAYLOADS

(75) Inventor: Stephen Wharton, Weatherford, TX (US)

(73) Assignee: CABLECAM, LLC, Fort Worth, TX (US)

(*) Notice: Subject to any disclaimer, the term of this patent is extended or adjusted under 35 U.S.C. 154(b) by 616 days.

(21) Appl. No.: 13/600,530

(22) Filed: Aug. 31, 2012

(65) Prior Publication Data

US 2013/0050652 A1    Feb. 28, 2013

Related U.S. Application Data

(63) Continuation-in-part of application No. 13/471,924, filed on May 15, 2012.

(60) Provisional application No. 61/529,676, filed on Aug. 31, 2011, provisional application No. 61/529,697, (Continued)

(51) Int. Cl.
    *G03B 31/00*      (2006.01)
    *G03B 17/00*      (2006.01)
    *G03B 15/00*      (2006.01)
    *G03B 17/56*      (2006.01)
    (Continued)

(52) U.S. Cl.
    CPC ............ *G03B 15/006* (2013.01); *F16M 11/18* (2013.01); *F16M 11/425* (2013.01); *G03B 17/56* (2013.01); *H04N 5/2251* (2013.01); *H04N 5/247* (2013.01); *H04N 13/0239* (2013.01)

(58) Field of Classification Search
    CPC ..... G03B 15/006; G03B 17/56; H04N 5/247
    USPC ............ 352/243, 34; 212/76; 348/143, 144, 348/145, 146, 147, 159; 396/7, 12, 13, 9; 248/317, 323, 328, 329
    See application file for complete search history.

(56) References Cited

U.S. PATENT DOCUMENTS 2,035,107 A    3/1936    Voss
3,221,897 A    12/1965    Matheson
(Continued)

FOREIGN PATENT DOCUMENTS

DE      102006036769      4/2008
GB      2422061 A      7/2006
(Continued)

OTHER PUBLICATIONS

International Search Report and Written Opinion for International Application No. PCT/US2012/053281, International Filing Date Aug. 31, 2012, Applicant Cablecam, INC.
(Continued)

*Primary Examiner* — William C Dowling
(74) *Attorney, Agent, or Firm* — Factor Intellectual Property Law Group, Ltd.

(57) ABSTRACT

A system for aerially moving a payload, the system having at least two payloads, at least one platform for carrying the at least two payloads, at least one line connected to the at least one object, the at least one line connected to the at least one platform in at least four locations, and at least one reel and motor coupled to the at least one line connected to the at least one platform, such that the at least one reel and motor in conjunction with the at least one line is capable of moving the at least one platform carrying the at least two payloads in at lest two of the x-, y-, and z-directions.

19 Claims, 3 Drawing Sheets

Related U.S. Application Data filed on Aug. 31, 2011, provisional application No. 61/532,788, filed on Sep. 9, 2011, provisional application No. 61/532,741, filed on Sep. 9, 2011, provisional application No. 61/607,993, filed on Mar. 7, 2012.

(51) Int. Cl.
*H04N 5/247* (2006.01)
*F16M 11/18* (2006.01)
*F16M 11/42* (2006.01)
*H04N 5/225* (2006.01)
*H04N 13/02* (2006.01)

(56) References Cited

U.S. PATENT DOCUMENTS

| | | | |
|---|---|---|---|
| 4,710,819 A * | 12/1987 | Brown | 348/144 |
| 4,882,773 A | 11/1989 | Maloney | |
| 5,113,768 A | 5/1992 | Brown | |
| 5,157,725 A | 10/1992 | Lindholm | |
| 5,225,863 A | 7/1993 | Weir-Jones | |
| 5,657,073 A | 8/1997 | Henley | |
| 5,778,303 A | 7/1998 | Shinozaki et al. | |
| 6,141,034 A | 10/2000 | McCutchen | |
| 6,301,034 B1 | 10/2001 | Speciale | |
| 6,709,172 B2 * | 3/2004 | Brown | 396/427 |
| 6,873,355 B1 * | 3/2005 | Thompson et al. | 348/144 |
| 7,036,436 B2 | 5/2006 | MacDonald et al. | |
| 7,058,966 B2 | 6/2006 | Buabbud | |
| 7,088,071 B2 | 8/2006 | Rodnunsky | |
| 7,127,998 B2 | 10/2006 | MacDonald et al. | |
| 7,224,382 B2 | 5/2007 | Baker | |
| 7,239,106 B2 | 7/2007 | Rodnunsky et al. | |
| 7,510,142 B2 | 3/2009 | Johnson | |
| 7,804,965 B2 | 9/2010 | Kawaguchi et al. | |
| 7,831,118 B2 | 11/2010 | Oikawa et al. | |
| 7,893,957 B2 | 2/2011 | Peters, III et al. | |
| 8,004,558 B2 | 8/2011 | Prechtl et al. | |
| 8,199,197 B2 * | 6/2012 | Bennett et al. | 348/144 |
| 2004/0160512 A1 | 8/2004 | Lee | |
| 2006/0033463 A1 * | 2/2006 | Rodnunsky et al. | 318/649 |
| 2006/0054782 A1 | 3/2006 | Olsen et al. | |
| 2006/0080722 A1 | 4/2006 | Santhoff | |
| 2006/0082655 A1 | 4/2006 | Vanderwill et al. | |
| 2007/0291143 A1 | 12/2007 | Barbieri et al. | |
| 2009/0017879 A1 | 1/2009 | Tsfaty et al. | |
| 2009/0103909 A1 | 4/2009 | Giegerich et al. | |
| 2009/0207250 A1 | 8/2009 | Bennett et al. | |
| 2009/0237492 A1 | 9/2009 | Kikinis et al. | |
| 2010/0013927 A1 | 1/2010 | Nixon | |
| 2010/0260483 A1 | 10/2010 | Strub | |
| 2010/0283854 A1 | 11/2010 | McKaughan et al. | |
| 2010/0288872 A1 | 11/2010 | Wiley | |
| 2011/0074916 A1 | 3/2011 | Demirdjian | |
| 2011/0091196 A1 | 4/2011 | Dougerty et al. | |
| 2011/0096136 A1 | 4/2011 | Liu et al. | |
| 2011/0196688 A1 | 8/2011 | Jones | |
| 2011/0204196 A1 * | 8/2011 | Wharton | 248/323 |
| 2011/0211524 A1 | 9/2011 | Holmes et al. | |
| 2012/0211628 A1 * | 8/2012 | Fisher et al. | 248/329 |

FOREIGN PATENT DOCUMENTS

| | | |
|---|---|---|
| WO | 9519903 | 7/1995 |
| WO | 2004109385 | 12/2004 |
| WO | 2005/013195 A1 | 2/2005 |
| WO | 2007/030665 A1 | 3/2007 |

OTHER PUBLICATIONS

Extended European Search Report for related European application No. 12828706.7 dated Apr. 14, 2015, 6 pages.

* cited by examiner

AERIAL MOVEMENT SYSTEM HAVING MULTIPLE PAYLOADS

RELATED APPLICATIONS

This application is a continuation-in-part of U.S. patent application Ser. No. 13/471,924 entitled "Control System and Method for an Aerially Moved Payload System" filed May 15, 2012; this application also claims priority to U.S. Provisional Application Ser. No. 61/529,676 entitled "3D Aerial Camera System" filed Aug. 31, 2011; U.S. Provisional Application Ser. No. 61/529,697 entitled "Control System for a 3D Aerial Camera" filed Aug. 31, 2011; U.S. Provisional Application Ser. No. 61/532,788 entitled "Digital Microphone and Digital Microphone Control System for an Aerially Moved Payload" filed Sep. 9, 2011; U.S. Provisional Application Ser. No. 61/532,741 entitled "Control System For An Aerially Moved Payload System" filed Sep. 9, 2011; and, U.S. Provisional Application Ser. No. 61/607,993 entitled "Aerial Camera System Having Multiple Payloads" filed Mar. 7, 2012—the contents of all of which are fully incorporated herein by reference.

FIELD OF THE INVENTION

The present invention is directed to an aerial movement system capable having and utilizing multiple payloads.

BACKGROUND OF THE INVENTION

Aerial movement systems are useful in moving a payload, like for example a camera, over large expanses such as football fields, basketball courts, movie sets, open fields, or even military testing sites. Examples of such systems which may be used to aerially move a payload may be found, for example, in U.S. Pat. Nos. 6,809,495; 6,873,355; 6,975,089; 7,088,071; 7,127,998; and, 7,239,106, and U.S. Publication No. 2011/0204197. While the remaining description will at times discuss these aerial movement systems with respect to moving a camera or imaging device or multiple cameras or multiple imaging devices, it should be appreciated by those having ordinary skill in the art that the present application, and all of the previously referenced patents, may be utilized to aerially move any payload over an expanse and is not limited to just a camera or imaging device or multiple cameras or imaging devices.

As described in various embodiments of the aforementioned patents, aerial movement systems having a payload, like for example a platform and/or a camera, typically include anywhere from one to five lines (e.g., a cables, ropes, strings, cords, wires, or any other flexible materials) attached to the payload. The one to five lines typically extend to the payload from four or five support beams surrounding the surface over which the payload is moved and are controlled by one to five motor reels which extend and retract each of the one to five lines attached to the payload. The motor reels may be controlled using timers, software algorithms, remote controls, or any means known in the art. As the line(s) are extended and retracted, the payload may be moved in two- or three-dimensions, i.e. in the X-direction, the Y-direction, and/or the Z-direction.

When utilizing an aerial movement system, in order to increase efficiency, operability, and safety, it is important to keep the payload weight to a minimum. Excessive weight may lead to malfunctions or inaccurate movement of the payload, or alternatively may not be supported and may lead to the payload being dropped, risking injury to individuals located under the payload and damage to the area surrounding or below the payload or even the payload itself. When the payload includes a camera, there are also additional concerns regarding access to the camera during operation and a limited ability to send signals to, and receive signals from, the camera when in operation.

In the present art, there are a few common methods of providing stereoscopic or three-dimensional ("3D") images for filming and television broadcasts.

One method of providing 3D images is utilizing "dynamic convergence." Dynamic convergence requires a first two-dimensional ("2D") camera forming one "eye" of the viewer, and a second 2D camera forming a second "eye" with the signals being merged to create a 3D image. When using dynamic convergence, the first camera is typically fixed, capturing images in a line of sight in front of it, while the second camera is movable or rotatable to "converge" and capture images at a specific point or distance along the line of sight of the first camera. With both the first and second 2D cameras focused on the focal point at a known distance from the first (or second) camera, a 3D image may be created by merging the two video signals. If a 3D image of a different person or object along the line of sight of the first, fixed camera is desired, then the rotatable second camera may be rotated to "converge" with the line of the first camera at a different point. For example, a first image may require a 3D image of a person at 20 ft. in front of the first camera, and a second image may require a 3D image of a second person 40 ft. in front of the first camera. In order to obtain the first image, the second camera would be rotated to converge with the first camera's line of view of the first person, 20 ft. in front of the first camera, and then to obtain the second image, the second camera would be rotated to converge with the first camera's line of view of the second person, 40 ft. in front of the first camera.

While utilizing a fixed and rotatable camera in the manner discussed above creates an acceptable 3D image, it does create an "off-kilter" or "off-center" image inasmuch as the image will be directly in front of the first camera and not between the cameras. Using this method limits the images that can be captured to only areas within the line of sight of the first camera—images not in the line of sight of the first camera require the first camera to be realigned.

In order to attempt to correct this, a second method for providing 3D images, which is substantially similar to the first, utilizes two movable or rotatable 2D cameras. As with the first method, the second method requires both 2D cameras focus and converge on a focal point a known distance from each camera, however rather than having to be in the line of sight with one of the cameras, the point may be, for example, between the two cameras, creating a truer or more centralized image. Making both cameras rotatable also allows for the cameras to be rotated to focus and converge on a second point for a different 3D image without having to move a fixed camera to insure the second point is within its line of sight. Utilizing the example from above, for a first image the two 2D cameras may rotated to converge to create a 3D image of a person standing 20 ft. slightly to the left and in front of the cameras, and for a second image the two 2D cameras may be rotated to converge to create a 3D image of a person standing 40 ft. slightly to the right and in front of the cameras.

In order to utilize either of the foregoing methods, the two 2D cameras must be "synchronized" in order to create a clear 3D image. Synchronization requires the both lenses be calibrated and set to synch images at various focal points and distances. Utilizing 2D cameras may also require that the motors for zooming the lenses be calibrated to focus on various focal points and distances. Due to the characteristics of the lenses and zoom motors, it may be necessary to synchronize the two 2D cameras for each focal point or distance which needs to be captured for a particular project.

Yet another method by which 3D images may be captured is utilizing "beam splitting" cameras. In a beam splitting configuration, a first camera is typically fixed in a similar manner as the first camera in the first method described above, filming or broadcasting everything in a line of sight of the camera, and a second camera is rotated 90° and films off of a mirror reflecting the image to be filmed or broadcasted and presented in 3D. Typically larger lenses are required when utilizing "beam splitting" as the cameras are set farther apart.

Regardless of which method is used, heavy equipment—particularly the cameras—and multiple, sometimes fifteen (15) or more video output cables are required to create the 3D images, rendering it nearly impossible to utilize 3D technology with aerial movement systems, which may only have the capability for handling four (4) video output cables. When additional or alternative payloads are required, like for example sound and/or data capturing devices, some or all of the output cables may be required to provide what is captured, further limiting the number of outputs available for captured images. In addition, in order to get a clear 3D image using dynamic convergence, multiple video output cables from each of the two cameras may be required—and if the image is not clear or properly converging at a point, additional cables are typically added. Furthermore, large amounts of time and access to the filming or broadcasting location may be required in order to calibrate the cameras to focus at numerous focal points and distances. In addition, when attempting to live broadcast 3D images that are fast moving at variable, and sometimes instantaneously changing and unpredictable distances from the cameras, the 3D images may flatten out and become 2D and may move in and out of focus, particularly if the cameras are moving and are remotely controlled.

Additionally, when being utilized for live broadcasts, like an American Football game for example, in order to broadcast in 2D and 3D two sets of production elements, i.e. trucks, cables, cameras etc., are required. Utilizing two sets of production elements requires additional means of sending signals to, and receiving signals from, any cameras, and requires increased payload weight, i.e. more cameras and equipment for controlling and/or moving the cameras.

In view of the foregoing, it would be advantageous to have a lightweight aerially moved payload which is capable of broadcasting and recording in 3D.

It would be further advantageous if such a system would be capable of providing crisp, clear, clean 3D images when broadcasting and recording fast moving images at variable, and sometimes instantaneously changing and unpredictable distances from the payload.

It would be further advantageous to have a system wherein an aerial payload system is capable of providing 2D and 3D images from the payload while utilizing the only a single production element.

It would also advantageous to have a system capable of accommodating numerous different types of imaging and other sound or data capturing devices, not just a 3D camera system.

The present invention is provided to solve these and other issues.

SUMMARY OF THE INVENTION

Accordingly, the present invention is directed to an aerial movement system capable of handling multiple payloads. According to one aspect of the invention, the system includes a platform or object capable of carrying multiple payloads, the platform or object having at least two lines (e.g., a cable, rope, string, cord, wire, or any other flexible material) attached thereto. The at least two lines are configured to support and move the platform or object and any carried payloads. Each of the at least two lines are connected to and controlled by a motor and reel combination, providing three-dimensional movement of the payloads. The at least two lines may also each be run through a sheave, each sheave connected to at least one structure located proximate an area over which the payloads are to travel. Alternatively, in some embodiments it is contemplated that the motor and reel combinations be connected to at least one structure located proximate an area over which the payloads are to travel.

According to another aspect of the invention, at least two payloads are carried by the platform or object for observing, measuring, and/or capturing images, data, and/or sound from an area proximate where the payload traverses. The payloads may include, but are not limited to, standard- or high-definition cameras or any other known imaging devices, cameras having zoom or prime lenses, analog or digital microphones, spectrum analyzers, thermometers or other temperature sensing devices, pressure sensing devices, light intensity or wavelength sensing devises, and wind speed and direction sensors. The at least two payloads may also include a position sensor or the like capable of providing information relative to the position of the sensor relative to the area over which the payload traverses, or, additionally or alternatively, the position of the payload relative to the motors and reels and/or sheaves.

According to another aspect of the invention, the at least two payloads carried by the platform or object each include a camera capable of being used to film and broadcast 2D or 3D images. In order to film or broadcast 2D or 3D images, a first camera may be fixed to capture images in a line of sight in front of the camera and platform or object. A second camera may be attached to the platform or object, offset to one side of the first camera, and angled to have a line of sight that intersects the line of sight of the first camera. For example, the second camera may be angled so as to record or broadcast images along a line of sight which intersects with the line of sight of the first camera at a first intersection point, i.e. a distance of 30 feet in front of the first camera and platform or object.

According to another aspect of the invention, a third payload in the form of a third camera may be attached to the platform or object. Like the second camera, the third camera may be offset to the side of the first camera and angled to have a line of sight that intersects with the line of sight of the first camera. Continuing the example provided herein, if the second camera is angled to have a line of sight which intersects the line of sight of the first camera at 30 feet, the third camera may be angled to record or broadcast images along a line of sight which intersects with the line of sight of the first camera at a second intersection point, i.e. a distance of 60 feet in front of the first camera and platform or object. The images of the first camera and the second or third camera may be converged to create a 3D image proximate the respective first or second intersection point.

Alternatively, the third camera may be a standard-definition or high-definition camera having its own line of sight which provides images that are not merged with any images captured by the first or second camera. The third camera may be placed on a gimbal or the like to allow for the camera to rotate independently of the platform or object in order to capture a wider array of 2D images.

According to another aspect of the invention, one or more of the first, second, and third cameras may include prime lenses.

According to another aspect of the invention, each of the first, second, and third cameras may provide a 2D image. The 2D image may be used to either record or broadcast 2D images within the line of sight of any of the first, second, or third cameras, or may be used to converge with the 2D image provided by another of the first, second, or third cameras to provide a 3D image. As should be appreciated by those having ordinary skill in the art, any images provided by each of the first, second, and third camera may be utilized to provide both 2D and 3D images.

According to another aspect of the invention, the second camera and the third camera may be set on opposite sides of the first camera, for example the second camera may be set to the left of the first camera and the third camera to the right of the first camera. Configuring the second and third cameras on opposite sides of the first camera creates a third intersection point where the line of sight of the second and third cameras intersect at some distance between the first and second intersection points creating a third distance at which the 2D images may be converged to create a 3D image.

Configuring the second and third cameras to the left and right of the first camera also enables the recording or broadcasting of 2D images directly in front of (from the first camera), to the left of (from the second or third camera), and to the right of (from the other of the second or third camera) the payloads creating a wide array of images. For example, when recording or broadcasting American Football, such a system could be used to broadcast images between the hash marks, and along each of the right and left sidelines from the overhead cameras while also providing three-dimensional images proximate each camera intersection point.

According to another aspect of the invention, at least a fourth payload is carried by the platform or object.

According to another aspect of the invention the at least fourth payload may include a fourth camera capable of being used to film and broadcast 2D or 3D images. The fourth camera may be similar to any of the first three cameras, or alternatively may contain a different lens or different operating features and capabilities, like for example the ability to zoom or capture images in high-definition if any or all of the first three cameras are incapable of capturing such images.

According to another aspect of the invention, the fourth camera may be mounted on a controllable structure attached to the platform or object carrying the payloads, the controllable structure being capable of angling and rotating the fourth camera independent of the movement of the platform or structure. The controllable structure may be any structure known in the art capable of rotating and angling a camera, like for example, a gimble.

According to another aspect of the invention the fourth camera may be a camera capable of providing infrared or night vision images.

According to another aspect of the invention a fourth camera may be configured in a manner similar to the second and/or third cameras, that is at an angle wherein the line of sight of the fourth camera intersects the line of sight of the first camera at a third intersection point allowing for convergence of the images to create a 3D image proximate a third distance. Following the example from above, if the lines of sight of the first and second cameras converge at 30 feet, and the lines of sight of the first and third cameras intersect at 60 feet, the lines of sight of the first and fourth camera may intersect at 90 feet.

As should be appreciated by those having ordinary skill in the art, any number of additional payloads in the form of cameras may be added in the same manner as the second, third, and fourth cameras so long as: the system is capable of handling the video outputs and aerially moving and supporting the weight of the payloads. Adding additional cameras in the same manner as the second, third, and fourth payloads creates additional intersection points. As more cameras are added, the number of intersection points increases, ultimately resulting in a possible infinite number of intersection points and substantially clear 3D image at any point in front of the first camera.

According to another aspect of the invention any of the second, third, fourth, or subsequent payloads may include at least one analog or digital microphone. It is contemplated by the invention that when audio recordings are desired, any number of additional payloads may be included in the system to provide directional sound or surround sound or to filter sound and provide sound from a particular location or area. It is further contemplated that both analog and digital microphones may utilized in a single system.

According to another aspect of the invention, any of the first, second, third, fourth, or subsequent cameras may be any type of imaging device or camera.

According to one aspect of the invention, the aerially moved payload system may traverse along side an area. The system includes a platform or object capable of carrying multiple payloads, the platform or object having at least two lines (e.g., a cable, rope, string, cord, wire, or any other flexible material) attached thereto. The at least two lines are configured to support and move the platform or object and any carried payloads. Each of the at least two lines are connected to and controlled by a motor and reel combination, providing two- or three-dimensional movement of the payloads along side an area to be observed. The at least two lines may also each be run through a sheave, each sheave connected to at least one structure located proximate the area along side which the payloads are to travel. Alternatively, in some embodiments it is contemplated that the motor and reel combinations be connected to at least one structure located proximate an area over which the payloads are to travel.

According to one aspect of the invention, at least two payloads are carried by the platform or object for observing, measuring, and/or capturing images, data, and/or sound from an area proximate where the payload traverses. The payloads may include, but are not limited to, standard- or high-definition cameras or any other known imaging devices, cameras having zoom or prime lenses, analog or digital microphones, spectrum analyzers, thermometers or other temperature sensing devices, pressure sensing devices, light intensity or wavelength sensing devises, and wind speed and direction sensors. The at least two payloads may also include a position sensor or the like capable of providing information relative to the position of the sensor relative to the area along side which the payload traverses, or, additionally or alternatively, the position of the payload relative to the motors and reels and/or sheaves.

Other advantages and aspects of the present invention will become apparent upon reading the following description of the drawings and detailed description of the invention.

DETAILED DESCRIPTION OF THE PRESENT INVENTION

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

Figure 1:
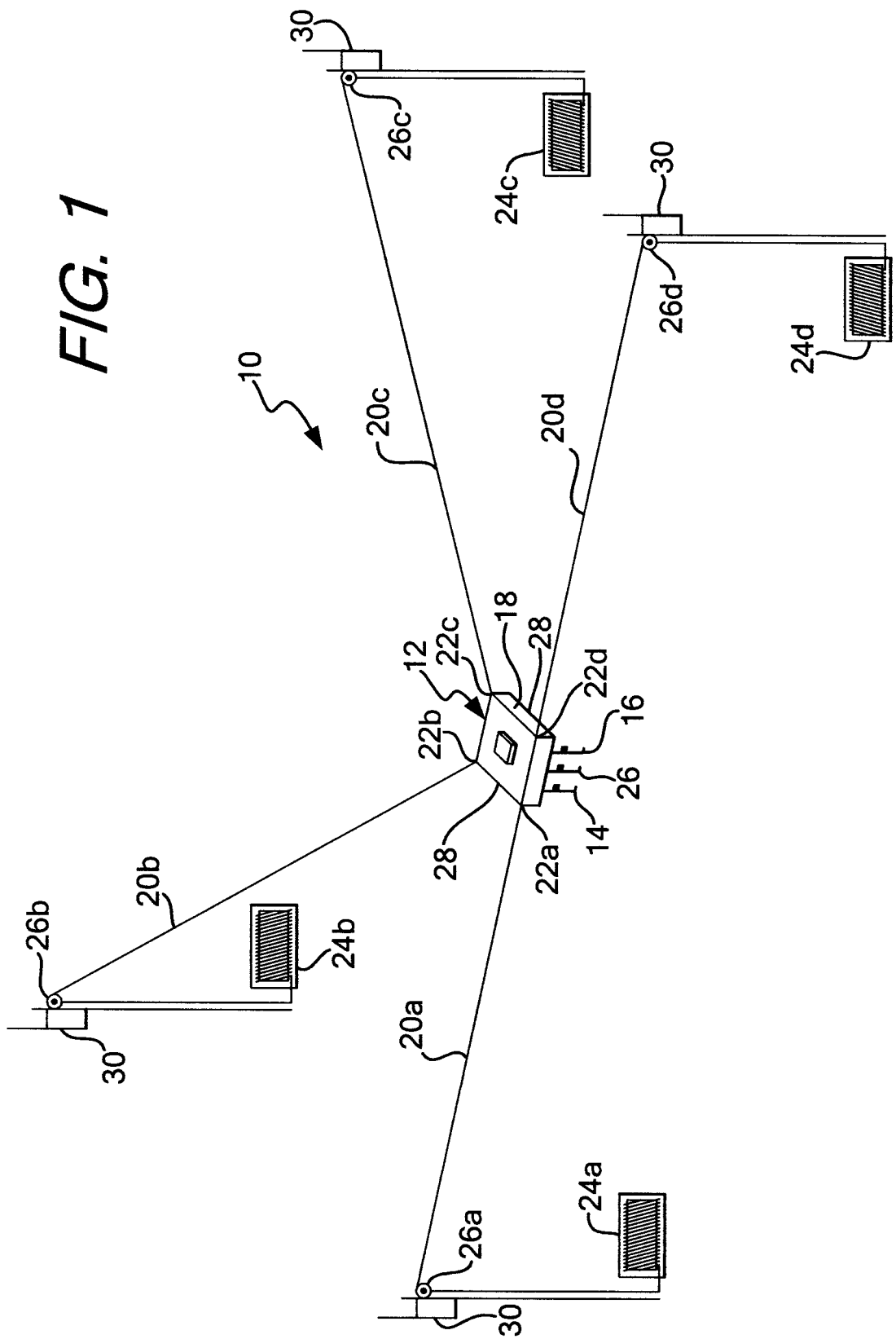
FIG. 1 shows an aerially moved payload system as contemplated by the invention.

FIG. 1 shows an embodiment of a system 10 for aerially moving a payload 12. Payload 12 includes at least two payloads 14, 16 carried by platform 18. In order to move payloads 14, 16 and platform 18 in the x-, y-, and z-directions, at least one line, shown as lines 20a-20d, are connected to the platform in four locations, shown as corners 22a-22d. Coupled to driving lines 20a-20d is at least one reel and motor combo, shown as motor and reel combinations 24a-24d. Motor and reel combinations 24a-24d act in conjunction with lines 20a-20d to move platform 18 and payloads 14, 16 in the x-, y-, and z-directions. As should be appreciated by those having ordinary skill in the art, lines 20a-20d may contain, or have attached thereto, coaxial, optical, or other cables capable of transmitting and receiving information to and between a remote location and payloads 14, 16 to provide, for example, any data or signals collected or obtained by payloads 14, 16, and provide control for moving platform 18 and payloads 14, 16 in the x-, y-, and z-directions. In order to further facilitate movement, sheaves 26a-26d may also be utilized to guide lines 20a-20d between motor and reel combinations 24a-24d and platform 18.

Each motor may be hard wired to a control center or connected using wireless signals, like for example RF signals, to receive control signals for moving its associated line. Signals may be transmitted from a pilot or other user at the control center using, for example a computer and/or transceiver, to the motor and reel combinations to control movement of the platform. The signals provided to the motor and reel combinations may additionally include control signals for the payload and any other components located on the platform used to capture and transmit any captured images, data, and/or sound. These additional control signals intended for use by the payload and related components located on the platform may be transmitted from the motor and reel combinations through any coaxial, optical, or other cables associated with lines 20a-20d.

Figure 2:
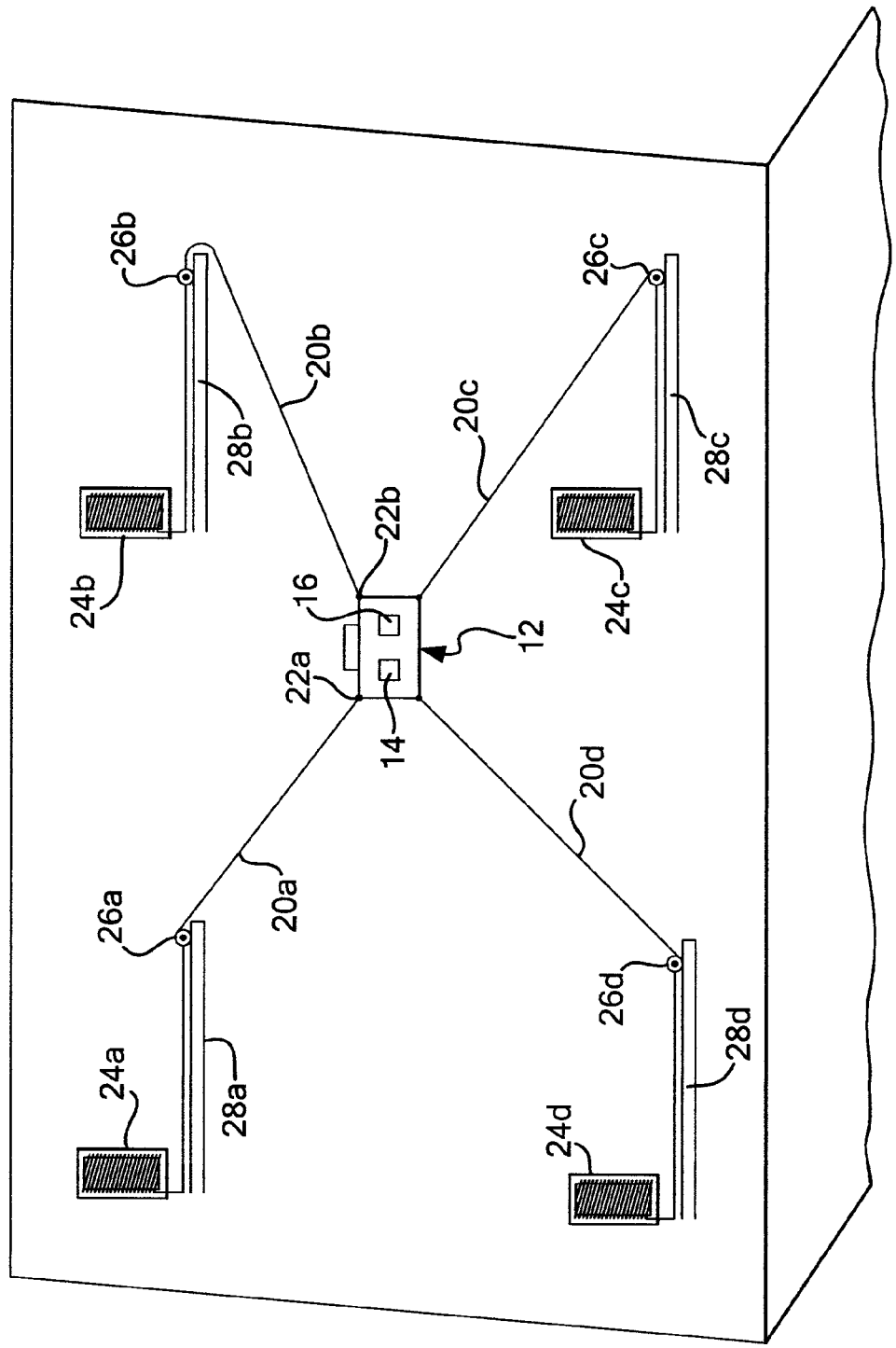
FIG. 2 shows an aerially moved payload system as contemplated by the invention.

Alternatively, as seen in FIG. 2, rather than traverse over an area, it is contemplated by the invention that aerial movement system 10 may allow for payload 12 to traverse along side an area. As seen in FIG. 2, posts or pillars 28 may extend substantially parallel to and/or above a ground surface or floor, allowing the payload to travel along side an area to be recorded. In such embodiments movement may be limited to only two directions, like for example the x- and z-directions. Configuring the system in this manner allows the payload to travel along side an area to obtain information when such is desirable or required.

Payloads 14, 16 may include, but are not limited to, standard- or high-definition cameras or any other known imaging devices, cameras having zoom or prime lenses, analog or digital microphones, spectrum analyzers or other devices capable of measuring frequency or signal strength at the payload, thermometers or other temperature sensing devices, pressure sensing devices, light intensity or wavelength sensing devises, and wind speed and direction sensors. The at least two payloads may also include a position sensor or the like capable of providing information relative to the position of the sensor relative to the area over which the payload traverses, or, additionally or alternatively, the position of the payload relative to the motors and reels and/or sheaves. Rather than provide a position sensor on the payload, registration points 30 may be placed proximate each line or support post used to guide each line to detect the position of the payload.

According to one embodiment of the invention, payloads 14, 16 include at least two cameras or other image capturing devices to be carried proximate an area to be studied, broadcasted, or filmed. Payloads 14, 16 may be, for example, lightweight video cameras containing standard definition, high-definition, or prime lenses, 3D mini cameras, cameras containing any filter lenses to enhance or remove particular colors from any images viewed and recorded or broadcast by the camera, infrared cameras or imaging devices, night vision cameras, thermal imaging devices, elevation or topography imaging devices, still-photo cameras, motion sensing cameras which only capture and/or provide images when detecting motion in the area proximate which the camera is located, slow-motion or high-speed cameras, or any combination thereof. In addition to any of the aforementioned examples, the present invention contemplates payloads 14, 16 being any device capable of capturing, broadcasting, recording, providing and/or filming optical images, with the possibility of mixing and matching any particular camera, for example, a thermal imaging device and an elevation or topography imaging device or devices to map and measure the characteristics of a chasm or volcano.

According to one embodiment of the invention, payloads 14, 16 are at least two cameras capable of capturing live images and providing signals to record or broadcast the same. As should be appreciated by those having ordinary skill in the art, the cameras may include lenses (standard-definition and high-definition) capable of zooming and focusing on a particular area to provide two-dimensional ("2D") images, or alternatively, may be prime lenses capable of providing images along a particular line of sight, without the ability to zoom or focus on an area along that line.

In order to provide three-dimensional ("3D") images in addition to the 2D images captured by the cameras, it is contemplated by the invention that the at least two cameras may be configured such that a line of sight of a first of the least two cameras intersects with a line of sight of a second of the at least two cameras at a first intersection point.

Figure 3:
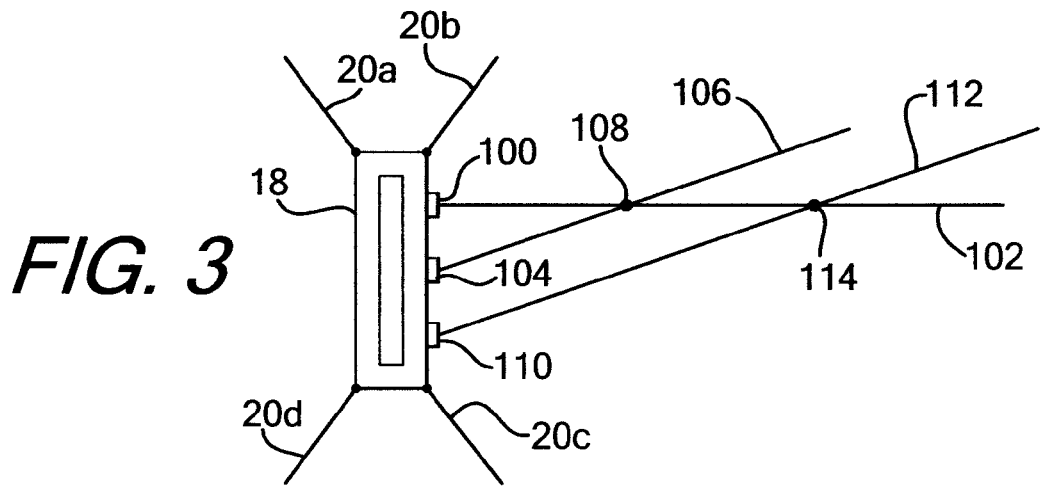
FIG. 3 shows a payload to be moved by an aerially moved payload system as contemplated by the invention.

As seen in FIGS. 2 and 3, first camera 100 may be configured to capture images along a first line of sight (exemplified by line 102) in front of camera 100 and/or platform 18 carrying camera 100, while second camera 104 may be configured at an angle, capturing images along a second line of sight (exemplified by line 106) which intersects line of sight 102 at first intersection point 108. By converging the 2D images of each camera at first intersection point 108, it should be appreciated that a 3D image can be captured proximate that particular area. The system is capable of broadcasting, recording, and filming images in 2D, using the images captured by either first camera 100 or second camera 104 or both independently, and 3D, by merging the images of the first camera 100 and second camera 104 captured proximate intersection point 108. It is contemplated by the invention that camera 104 may be angled to provide intersection point 108 at any known distance in front of first camera 100 and/or platform 18.

In order to transmit two or more image signals to a control or production center for use, the payload and system may include a control system for manipulating all of the image signals to allow for multiple signals to be transmitted along a single line rather than each image signal taking up an entire line. For example, in order to broadcast in 3D, a platform may be provided with two or more standard or prime lens cameras capturing images along lines of sight which intersect at certain distances. In such embodiments, a media converter may be attached to each camera to convert the captured images from coax signals to fiber signals. In embodiments where only two cameras are used, each coax cameral signal may be converted to a fiber signal, one at a first wavelength, like for example 1310 nm, and one at a second wavelength, like for example 1550 nm. A wave-division multiplexer or coarse-wave-division multiplexer may then be used to join the converted fiber signals into a single, combined fiber signal. The combined signal may then be transmitted along a single fiber line so that the remaining fiber lines may be left available for transmitting data, high-definition video feeds, other imaging devices, sound, data or the like. If additional video signals are desired to create 2D images and/or 3D convergence points, additional cameras may be attached to the platform and have signals that are converted, joined and transmitted along a single line, two or more up to a maximum of 16 total video signals in a single combined signal. Once transmitted to the control center, or at some point just before, a second wave-division multiplexer or coarse-wave-division multiplexer or de-multiplexer may split the combined fiber signals which may be used by the control center, or re-converted to a coax signal by one or more media converters for use by the control center.

Figure 4:
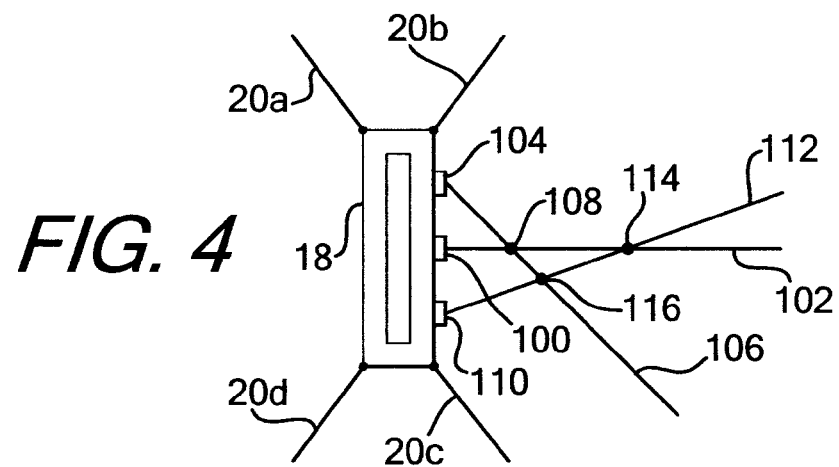
FIG. 4 shows a payload to be moved by an aerially moved payload system as contemplated by the invention.

As also seen in FIGS. 1, 3 and 4, system 10 may further include at least a third payload 26 which may be third camera 110. As seen in FIGS. 2 and 3, like second camera 104, third camera 110 may be angled to capture images along line of a third sight (exemplified by line 112) which intersects with line of sight 102 of first camera 100 at second intersection point 114. As with first intersection point 108, the 2D images of first camera 100 and third camera 110 may be converged to create a 3D image proximate that particular point or location. Adding third camera 110 adds an additional 2D image which may be captured and broadcasted, recorded, or filmed, while creating a 3D image that is at a different location from any 3D image created by first camera 100 and second camera 104. During live action events, like for example American Football, this allows cameras 100, 104, 110 to be set and intersection points 108, 114 to be constant, lessening the burden of calibrating the lenses of cameras 100, 104, 110 over multiple focus or zoom points to create clear 3D images as the convergence points are known and substantially constant, while having a system capable of capturing and providing 3D images of sequences which may instantaneously and unpredictably change. Even though anyone controlling the camera is unaware, and therefore not prepared, that the 3D focal point is about to instantaneously switch from approximately a first focal intersection point 108 to approximately a second intersection point 114, 3D images may still be broadcast by merely switching which line of sight is combined with line of sight 102 of first camera 100.

It should be appreciated by those having ordinary skill in the art that in addition to cameras 100, 104, 110, that any number of additional cameras maybe added to the system so long as the platform is capable of safely carrying the cameras, the lines and reels and motors can safely and easily move the platform and cameras, and the system is capable of providing enough signals too and from the platform to control the system and receive images, audio, and/or data that is captured by the system as well. Adding additional cameras allows for additional intersection points, creating a greater continuum of convergence points for better quality 3D images to be provided from particular areas.

Rather than add numerous additional cameras, in order to create additional intersection and convergence points, as shown in FIG. 4 it is contemplated by the invention to set at least two cameras, cameras 104, 110, on the opposite side of the first camera, camera 100. Setting cameras 104, 110 on opposite sides of camera 100 creates a third intersection point 116 where 2D images may be converged into a 3D image at a third distance from platform 18. As should be appreciated by those having ordinary skill in the art, offsetting just one camera to the opposite side of the first camera capturing images in a straight line of sight will create two additional intersection and convergence points of the line of sight for every camera added, one with the first camera and one with the offset camera.

If additional cameras are staggered, additional intersection or 3D convergence points will be created—one with the first camera and one with each camera on the opposite side of the first camera—as the angles from cameras to the right of the first camera will result in their line of sight to intersect with the line of sight of the cameras to the left of the first camera. As each additional camera is added to the system, the number of intersection and 3D convergence points will be equal to the number of cameras on the opposite side of the first camera of the camera added, (i.e. if a camera is added to the right side, the number of intersection and convergence points will be equal to the number of cameras on the left side) plus one additional intersection and convergence point for the first camera. As an example adding a camera to the right of the first camera with three cameras on the left of the first camera will result in four line of sight intersection or 3D convergence points—three with the line of sight of the cameras to the left of the first camera, and one with the line of sight with the first camera.

In order to take full advantage of the ability to instantaneously switch without having to worry about calibration of lenses and having to adjust, for example, the lens of first camera 100 when the image that is to be captured instantaneously and unpredictably changes from 10 yards to 20 yards or some other similar distance, in a preferred embodiment of the invention, each of cameras 100, 104, 110 may include a prime lens. As should be appreciated by those having ordinary skill in the art, prime lenses are only capable of filming the entire line of sight in front of them and do not contain any zoom capabilities—instead like human eyes they view everything directly in front of them, eliminating the concern of having to match the zoom or focus of first camera 100 with third camera 110 when the capture of images is immediately desired at second intersection point 114. Utilizing prime lens cameras also reduces the number of control and signal elements that may have to be sent to and provided from each camera, and also reduces the weight of the cameras and therefore the strain on platform 18, lines 20*a*-20*d*, and motors 24*a*-24*d*. Reducing the required the number of signals that must be provided to and from the payloads and the weight of the payloads allows for more cameras (or other payloads) to be added to the system, allowing for additional cameras (or other payloads, like for example microphones, other imaging devices, or data measuring and collecting sensors), to be added to the system to create a more robust 3D broadcast, and a more robust and better sound quality.

Figure 5:
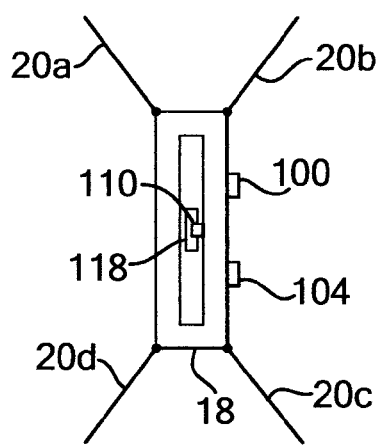
FIG. 5 shows a payload to be moved by an aerially moved payload system as contemplated by the invention; and, FIG. 6 shows a payload to be moved by an aerially moved payload system as contemplated by the invention.

Rather than only capture and broadcast, record, or film 2D images directly in front of, for example, any or all of payloads 14, 16, 26 may include a camera or imaging device having different operating features than the remaining two devices. For example, as shown in FIG. 5, cameras 100, 104 may be fixed along specific sight line (and in some embodiments include prime lenses or high-definition lenses) for providing images in 3D, while camera 110 may include a standard-definition or high-definition lens capable of zooming or be a completely different type of imaging. The third camera may also be used to capture images along a line of sight completely independent of the lines of sight of the first or second cameras. In order to capture a wider array of images, any or all cameras or imaging devices having an independent line of sight and/or similar or different operating characteristics may be attached to a gimble 118 or other device capable of rotating, tilting, or otherwise moving the camera independently of the platform and remaining cameras.

Figure 6:
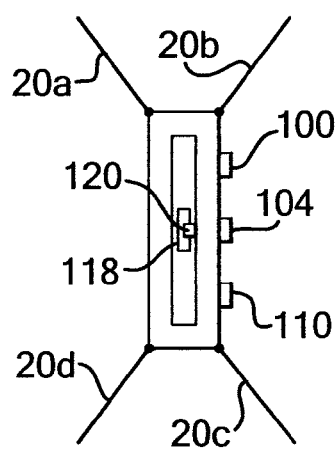

Alternatively, as shown in FIG. 6, the system may include at least one additional or a fourth payload 120, the at least one additional or fourth payload including a fourth camera. Utilizing a fourth camera may be particularly advantageous when cameras 100, 104, 110 each contain prime lenses to enable easy capturing a broad array of 3D images, while the fourth camera has a line of sight completely independent of the first, second, or third cameras and includes the ability to zoom and focus on particular locations, capturing better or closer up 2D images than any of cameras 100, 104, 110 are capable of providing. The fourth camera may also be attached to a gimble or other device 118, capable of rotating the fourth camera to capture images at any point on the area to be filmed, regardless of the position of platform 18. Rotation, both vertically and horizontally, would allow for wider range of capture of 2D images than 3D images, providing additional images that a system using cameras 100, 104, or cameras 100, 104, 110, may miss.

In embodiments where any of the first, second, third, fourth, or subsequent payloads are imaging devices other than a camera, it is contemplated that the line of sight of one or more image capturing device may be positioned and directed independent of the line of sight of any other image capturing device. For example, if a standard camera, an infrared camera, and a night vision camera are provided as the three payloads on the device, the line of sight of each payload may be positioned as desired by the user so as to capture the images desired without regard to any specific convergence points or overlap. For example, if, as shown in FIG. 5, payload 120 is a standard camera, camera 100 is a thermal imaging device, camera 104 is a night vision camera, and camera 110 has a lens to filter out the color yellow, the lines of sight of each camera may be such that they overlap, intersect or all face in complete different directions.

As mentioned herein, in addition to, or in place of, at least two cameras being included in payload 12, at least one microphone or other audio capturing device (shown in FIG. 1 as microphones 28) may be included in the payload to provide audio over the area to be captured. The microphones may be analog or digital microphones configured in a phased array. When used in combination with a 3D set up having multiple intersection and convergence points as described above, arranging the microphones in a phased array matched to the intersection points allows for better audio quality as the image shifts from the first intersection point to the second intersection point instantaneously. Any captured audio may be embedded with a captured or phantom video signal creating an A/V signal for media conversion and/or further multiplexing as described above.

Additionally, or as a further alternative, sensors capable of measuring various desired data may be included in the payload in place of, or in addition to, any cameras and/or microphones. Any sensors utilized in the payload may be configured in any manner which will allow the sensors to measure a desired characteristic in a desired direction. Examples of sensors which may be utilized include but are not limited to, spectrum analyzers or other devices capable of measuring frequency or signal strength at the payload, thermometers or other temperature sensing devices, pressure sensing devices, light intensity or wavelength sensing devises, and wind speed and direction sensors. The collected data may be transmitted from the payload to the control center directly along one of the lines associated with the movement system. Alternatively, any collected data may be converted to a sound wave, using a modem, and embedded in a captured or phantom video signal and transmitted as an A/V signal to the control center. When received at the control center, the A/V signal may be split and the data signal de-modulated at a modem, to return the converted sound signal back to data.

While in the foregoing there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

I claim:

1. A system for aerially moving a payload, the system comprising:
   at least two image capturing devices;
   at least one platform for carrying the at least two image capturing devices;
   at least one line connected to the at least one platform, the at least one line connected to the at least one platform;
   at least one reel and motor coupled to the at least one line connected to the at least one platform, such that the at least one reel and motor in conjunction with the at least one line is capable of moving the at least one platform carrying the at least two image capturing devices in a x-, y-, and z-direction, wherein
   the at least two image capturing devices are cameras, the cameras being configured such that a line of sight of a first of the least two cameras intersects with a line of sight of a second of the at least two cameras at a first intersection point.

2. The system of claim 1 further comprising at least a third camera, the third camera having a line of sight which intersects with the line of sight of the first camera at a second intersection point.

3. The system of claim 2 wherein the line of sight of the second camera intersects with the line of sight of the third camera at a third intersection point.

4. The system of claim 2 wherein each of the first, second, and third cameras include a prime lens.

5. The system of claim 1 further comprising a third camera, the third camera capturing images along a third line of sight wherein the third line of sight is independent of the first and second lines of sight.

6. The system of claim 2 further comprising a fourth camera.

7. The system of claim 6 wherein the fourth camera is capable of zooming in and focusing on objects in a line of sight of the fourth camera.

8. The system of claims 7 further comprising a gimble, the gimble being operably attached to the fourth camera so as to enable the fourth camera to move rotate independent of any of the at least one platform and any other cameras.

9. The system of claim 1 further comprising at least one microphone attached to the at least one platform.

10. The system of claim 9 wherein the at least one microphone is a digital microphone.

11. The system of claim 10 further comprising at least two digital microphones attached to the at least one platform.

12. The system of claim 10 wherein the system includes an array of digital microphones.

13. The system of claim 1 further comprising at least four lines and at least four reels and motors wherein the at least four lines and the at least four reels and motors are connected to the platform and such that the at least four reels and motors in conjunction with the at least four lines are capable of moving the at least one object carrying the at least two payloads in a x-, y-, and z-direction.

14. The system of claim 13 wherein each of the four lines are capable of transmitting and receiving data to and from the at least two payloads.

15. A method of providing three-dimensional images utilizing aerially moved cameras, the method comprising the steps of:
attaching a first camera to an platform capable of carrying multiple payloads;
configuring the first camera to capture images along a first line of sight;
attaching a second camera to the platform;
angling the second camera to capture images along a second line of sight such that the second line of sight intersects the first line of sight at a first intersection point;
attaching at least one control line to the object
attaching at least one reel and motor to the object; and,
moving the object in the x-, y-, and z-directions utilizing the at least one control line.

16. The method of claim 15 further comprising the steps of:
attaching at least one additional camera to the platform; and,
angling the at least one additional camera to capture images along at least one additional line of sight, the at least one additional line of sight intersecting the first line of sight at at least one additional intersection point.

17. The method of claim 15 further comprising the steps of:
attaching at least one additional camera to the platform; and,
capturing images along a third line of sight using the third camera, the third line of sight being independent of the first and second lines of sight.

18. The method of claim 16 further comprising the step of attaching at least one microphone to the platform for capturing sound related to the captured images.

19. A method of providing three-dimensional images utilizing aerially moved cameras, the method comprising the steps of:
attaching a first camera to an platform capable of carrying multiple payloads;
configuring the first camera to capture images along a first line of sight;
attaching a second camera to the platform;
angling the second camera to capture images along a second line of sight such that the second line of sight intersects the first line of sight at a first intersection point;
attaching at least one control line to the object, the at least one control line including a transmission medium;
combining the images captured by the first and second cameras into a single signal and transmitting the single signal from the platform along the transmission medium.

* * * * *